United States Patent
Pawlowski

(12) 
(10) Patent No.: US 6,224,208 B1
(45) Date of Patent: May 1, 2001

(54) COLOR CHANGING SUNGLASS FRAMES

(76) Inventor: Keith Pawlowski, 968 Emerald St. Suite 241, San Diego, CA (US) 92109

( * ) Notice: Subject to any disclaimer, the term of this patent is extended or adjusted under 35 U.S.C. 154(b) by 0 days.

(21) Appl. No.: 09/490,021

(22) Filed: Jan. 21, 2000

Related U.S. Application Data

(60) Provisional application No. 60/117,331, filed on Jan. 21, 1999.

(51) Int. Cl.$^7$ .................................................. G02C 11/02
(52) U.S. Cl. .................................. 351/51; 351/44; 351/52
(58) Field of Search .................................. 351/51, 52, 44, 351/41, 158

(56) References Cited

U.S. PATENT DOCUMENTS 4,828,355 * 5/1989 Lipson et al. ........................... 351/51

* cited by examiner

Primary Examiner—Hung Xuan Dang
(74) Attorney, Agent, or Firm—Gary L. Eastman

(57) ABSTRACT

Color Changing Sunglass Frames include two temple support members hingedly attached to a frame assembly. The frame assembly includes a left lens frame and a right lens frame which are identically shaped and attached in the middle by a center support structure. Each lens frame holds a corresponding sunglass lens. The temple support members extend beyond the user's ears to hold the sunglasses on his or her head. The entire sunglass frame is treated with a photo-chromatic dye. As the sunglass frames are exposed to ultraviolet light the photo-chromatic dye will react to the light and the frames will change colors. When the sunglass frames are removed from the ultraviolet light exposure they will return to their original color.

16 Claims, 3 Drawing Sheets

COLOR CHANGING SUNGLASS FRAMES

RELATED APPLICATIONS

This application is a Continuation of now abandoned Provisional Patent Application Ser. No. 60/117,331, filed Jan. 21, 1999.

FIELD OF THE INVENTION

The present invention relates generally to devices worn to protect a person's eyes from exposure to the sun. More specifically, the present invention pertains to sunglass frames. The present invention is particularly, though not exclusively, useful as a means by which sunglass frames may change colors when exposed to ultraviolet light.

BACKGROUND OF THE INVENTION

As a result of the need to protect their eyes from exposure to harmful solar radiation, many people own at least one pair of sunglasses, however, sunglasses have become more than just a device for protecting eyes from ultraviolet radiation. Sunglasses have become a fashion accessory that allows people to express themselves through the styles that they choose to wear. Unfortunately, the sunglass market has become saturated with different styles and creative new ideas are minimal.

In an attempt to capitalize on the growing sunglass market, established sunglass manufacturers and newcomers to the industry introduce new styles of sunglass frames each year. The problem is that many of these new styles of at sunglass frames are somewhat ordinary and will not grab the attention of the consumer. Most of these manufactures concentrate on the shape of the sunglass frames and the color of the frames is an afterthought. Sunglass designers are limited to a static color applied to the frames and thus, the creativity of the sunglass frame design is based mostly on the shape of the frame.

Accordingly, it is an object of the present invention to provide sunglass frames which will change colors when exposed to ultraviolet light. It is another object of the present invention to provide sunglass frames which are stylish in shape and in color. It is another object of the present invention to provide sunglass designers another avenue for creativity when designing sunglass frames. It is yet another object of the present invention to provide sunglass frames which are easy to use, easy to manufacture, and comparatively cost effective.

SUMMARY OF THE INVENTION

In accordance with the present invention, Color Changing Sunglass Frames are provided and include two temple support members hingedly attached to a frame assembly. The frame assembly includes a left lens frame and a right lens frame which are identically shaped and attached in the middle by a center support structure. Each lens frame holds a corresponding sunglass lens. The temple support members extend beyond the user's ears to hold the sunglasses on his or her head.

The entire sunglass frame is treated with a photo-chromatic dye. As the sunglass frames are exposed to ultraviolet light the photo-chromatic dye will react to the light and the frames will change colors. When the sunglass frames are removed from the ultraviolet light exposure they will return to the original color.

The invention as described above will overcome the disadvantage of the current sunglass frames. For example, the present invention provides fashionable, stylish sunglass frames which will change colors when exposed to ultraviolet light. The present invention also provides a new avenue for sunglass designers to experiment with when designing sunglass frames. With its novelty, the present invention will attract new sales in an otherwise saturated market.

DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION

Figure 1:
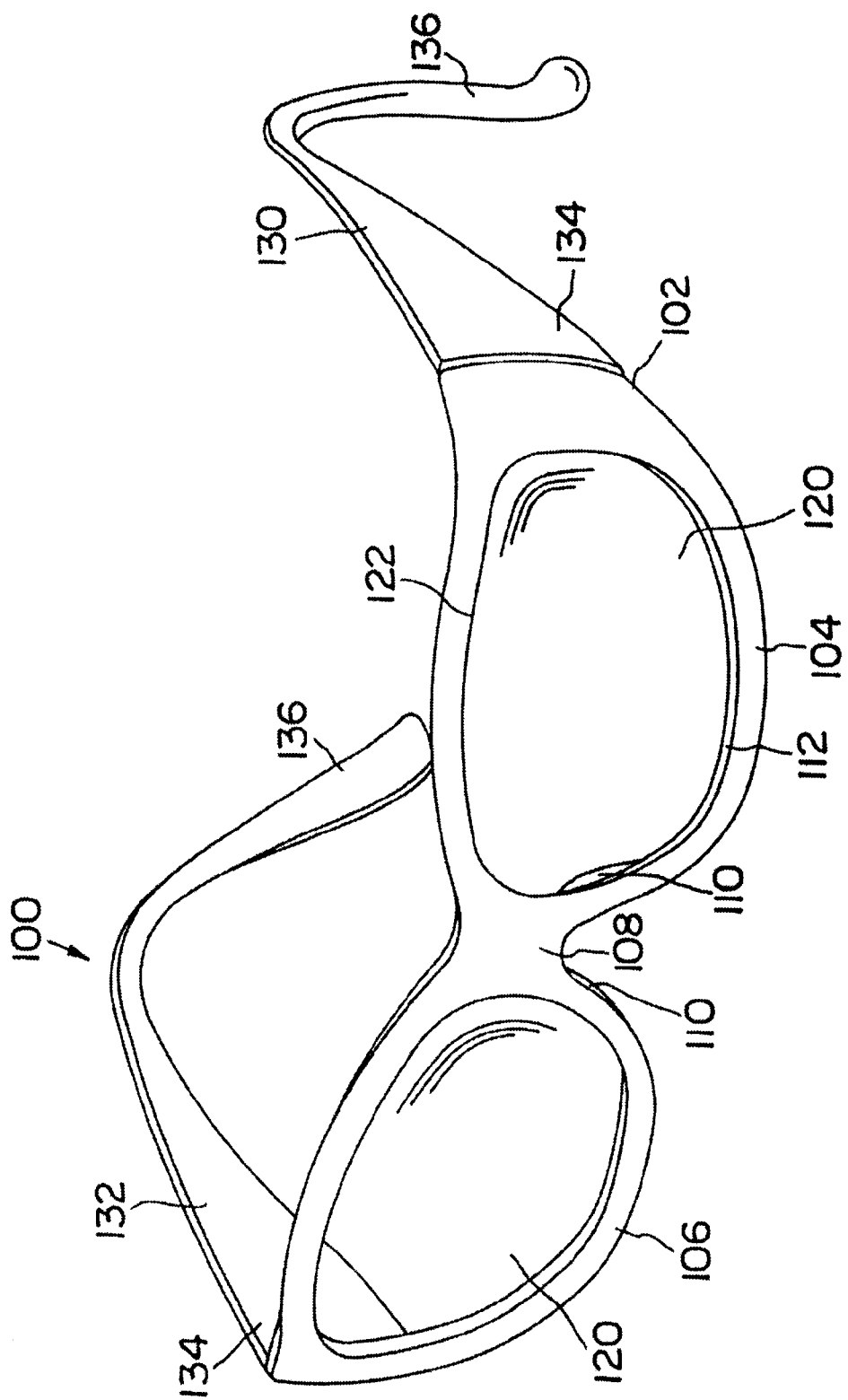
FIG. 1 is a perspective view of the Color Changing Sunglass Frames of the present invention.

Referring to FIG. 1, the Color Changing Sunglass Frames of the present invention are shown and generally designated 100. In a preferred embodiment, the Color Changing Sunglass Frames 100 may be constructed of plastic. It is to be appreciated, however, that any material with similar strength and ease of manufacture well known in the art would suffice.

FIG. 1 shows a frame assembly 102 which includes a left lens frame 104 attached to a right lens frame 106 by a center support member 108. The left lens frame 104 and the right lens frame 106 are identically shaped and each holds a tinted sunglass lens 120. Molded into the left lens frame 104 and the right lens frame 106 is a nose support 110. It is to be appreciated that the left lens frame 104 and the right lens frame 106 may be shaped in virtually any manner. It can also be appreciated that the corresponding sunglass lenses 120 may have nearly any shape.

Whatever shape is chosen for the sunglass lenses 120, the left lens frame 104 and the right lens frame 106, the exterior perimeter 122 of the sunglass lenses 120 will correspond to the interior perimeter 112 of the left lens frame 104 and the right lens frame 106. This will allow the sunglass lenses 120 to fit snugly into the left lens frame 104 and the right lens frame 106.

FIG. 1 shows the left temple support 130 and the right temple support 132 with a proximal end 134 and a distal end 136. The left temple support 130 and the right temple support 132 are attached hingedly to the frame assembly 102 by a pin 150 inserted through the proximal end 134 of the left temple support 130 and the proximal end 134 of the right temple support 132. The distal end 136 of the left temple support 130 and the distal end 136 of the right temple support 132 are bent to fit around the user's ear (not shown).

It is to be appreciated that the frame assembly 102, the left temple support 130 and the right temple support 132 may be configured in a multitude of shapes. Regardless of the shapes chosen, the entire frame assembly 102, the entire left temple support 130 and entire the right temple support 132 may be imbued with a color changing agent, for example, a photochromatic dye such as Spirooxazine or Chromene. This treatment will allow these components to change colors when worn in ultraviolet light and return to the original color when no longer exposed to the ultraviolet light. It can be appreciated that the Color Changing Sunglass Frames of the present invention may change from clear to green, blue to green, light green to dark green, or from a variety of other colors to another color.

In a preferred embodiment, the frame assembly 102, the left temple support 130 and the right temple support 132 may be completely spray coated with the photo-chromatic dye. Alternatively, this dye may be injected into the plastic, mixed with the plastic, sprayed in patterns on the Color Changing Sunglass Frames 100, or multiple types of photochromatic dyes could be used.

Figure 2:
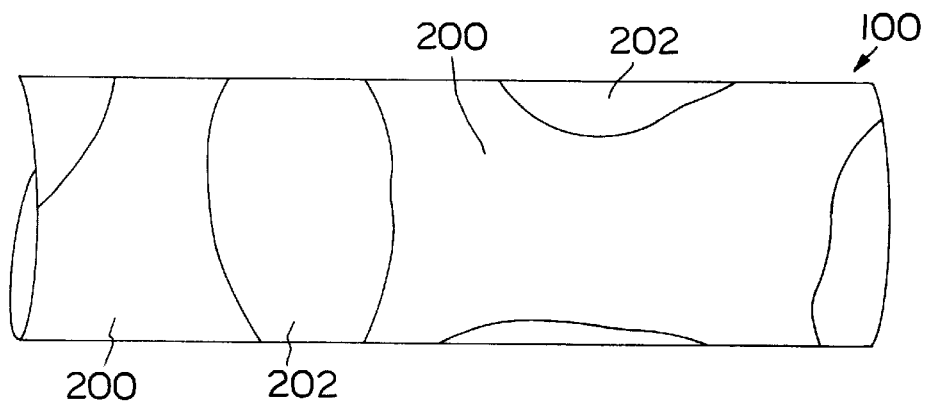
FIG. 2 is a detailed view of a portion of the Color Changing Sunglass Frames of the present invention showing a tortoise shell pattern.

FIG. 2 shows detailed view of a portion of the Color Changing Sunglass Frames 100 having a tortoise shell pattern. The background 200 is one color and the pattern 202 is another color. As the Color Changing Sunglass Frames of the present invention are subjected to ultraviolet light, the background 200 and the pattern 202 may change to different colors. It can be appreciated that the background 200 and the pattern 202 may be treated with any color photo-chromatic dye.

Figure 3:
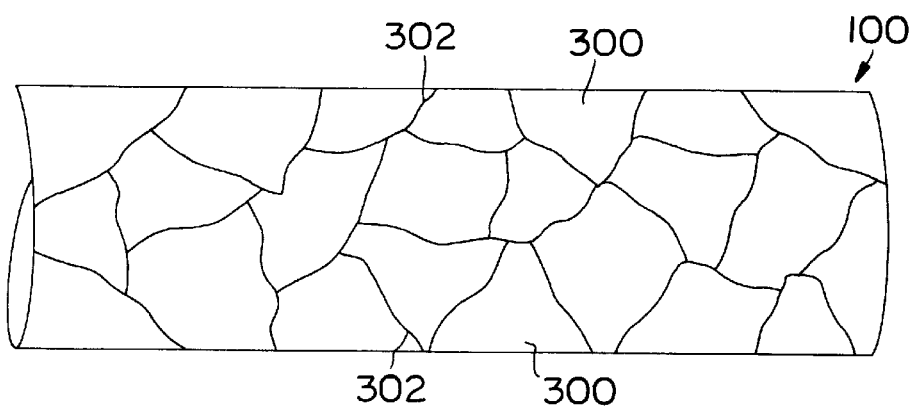
FIG. 3 is a detailed view of a portion of the Color Changing Sunglass Frames of the present invention showing a marble pattern.

FIG. 3 shows detailed view of a portion of the Color Changing Sunglass Frames 100 having a marble pattern. The background 300 is one color and the pattern 302 is another color. As the Color Changing Sunglass Frames of the present invention are subjected to ultraviolet light, the background 300 and the pattern 302 may change to different colors. It can be appreciated that the background 300 and the pattern may be treated with any color photo-chromatic dye.

Figure 4:
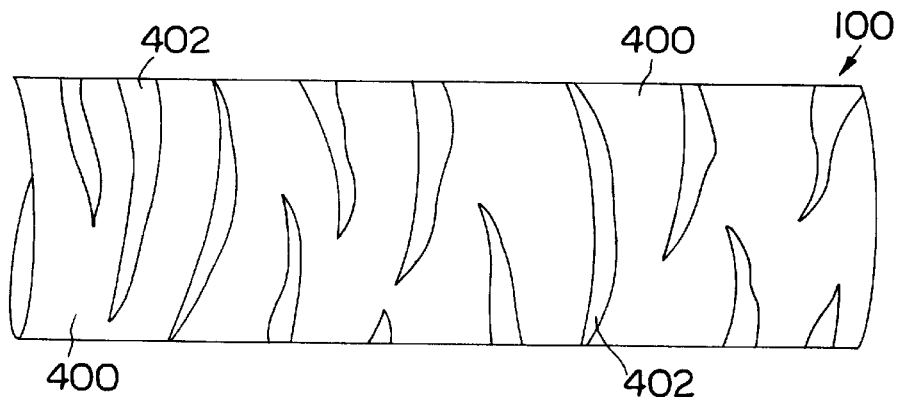
FIG. 4 is a detailed view of a portion of the Color Changing Sunglass Frames of the present invention showing a zebra pattern.

FIG. 4 shows detailed view of a portion of the Color Changing Sunglass Frames 100 having a zebra or tiger pattern. The background 400 is one color and the pattern 402 is another color. As the Color Changing Sunglass Frames of the present invention are subjected to ultraviolet light, the background 400 and the pattern 402 may change to different colors. It can be appreciated that the background 400 and the pattern 402 may be treated with any color photo-chromatic dye.

Figure 5:
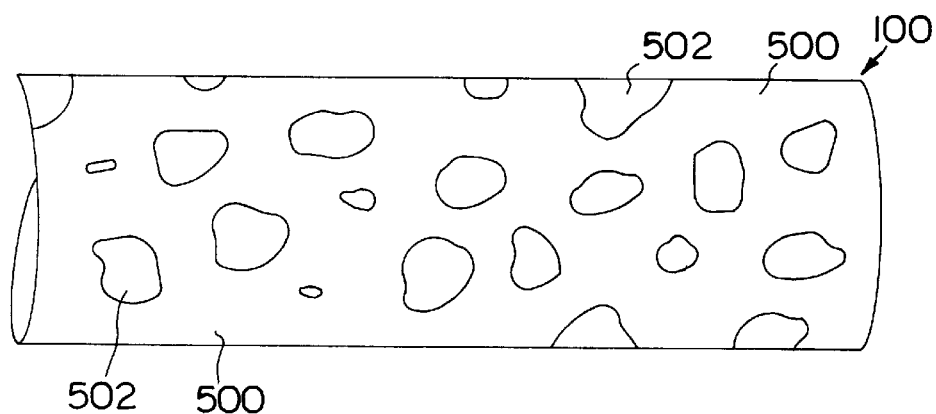
FIG. 5 is a detailed view of a portion of the Color Changing Sunglass Frames of the present invention showing a leopard pattern.

FIG. 5 shows detailed view of a portion of the Color Changing Sunglass Frames 100 having a leopard pattern. The background 500 is one color and the pattern 502 is another color. As the Color Changing Sunglass Frames of the present invention are subjected to ultraviolet light, the background 500 and the pattern 502 may change to different colors. It can be appreciated that the background 500 and the pattern 502 may be treated with any color photochromatic dye.

Figure 6:
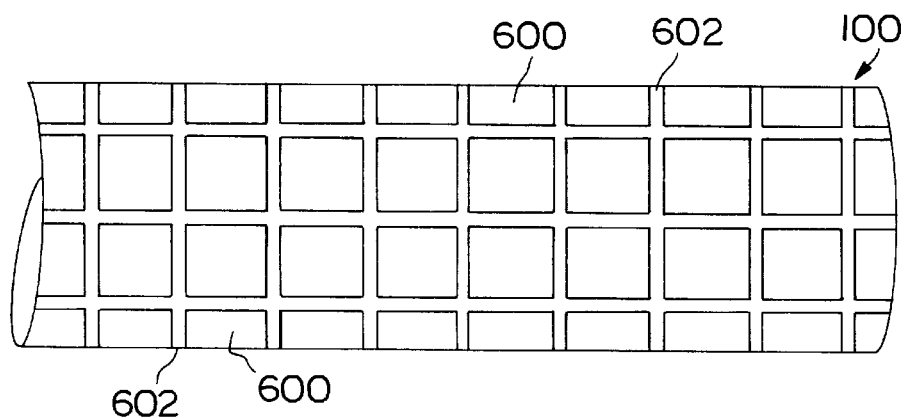
FIG. 6 is a detailed view of a portion of the Color Changing Sunglass Frames of the present invention showing a plaid pattern.

FIG. 6 shows detailed view of a portion of the Color Changing Sunglass Frames 100 having a plaid pattern. The background 600 is one color and the pattern 602 is another color. As the Color Changing Sunglass Frames of the present invention are subjected to ultraviolet light, the background 600 and the pattern 602 may change to different colors. It can be appreciated that the plaid pattern may be oriented in any direction. It can also be appreciated that the background 600 and the pattern 602 may be treated with any color photo-chromatic dye.

Figure 7:
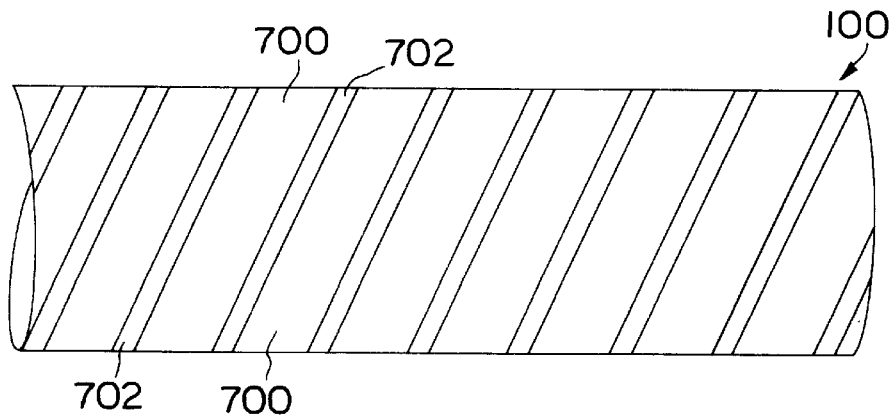
FIG. 7 is a detailed view of a portion of the Color Changing Sunglass Frames of the present invention showing a striped pattern.

FIG. 7 shows detailed view of a portion of the Color Changing Sunglass Frames 100 having a striped pattern. The background 700 is one color and the pattern 702 is another color. As the Color Changing Sunglass Frames of the present invention are subjected to ultraviolet light, the background 700 and the pattern 702 may change to different colors. It can be appreciated that the pattern may be oriented in any direction. It can also be appreciated that the background 700 and the pattern 702 may be treated with any color photo-chromatic dye.

In an alternative embodiment, the sunglass lenses 120 may also be coated with the photo-chromatic dye. This would allow the sunglass lenses 120 to also change colors when the user walks into the sunlight. The sunglass lenses 120 may be treated with photo-chromatic dyes which contrast the photo-chromatic dyes applied to the frame assembly 102, the left temple support 104 and the right temple support 106. The transitory nature of the photo-chromatic dyes used to treat the frames and lenses allows the sunglass designer a new avenue for creating stylish frames. The eyewear designer may not only use the physical shape of the sunglass frames as a basis for creative designs, but he or she may also use the colors of the frames and lenses and the changeability of these colors as a basis for creative designs. The eyewear designer may also choose to treat regular eyeglasses with the photo-chromatic dyes.

While the Color Changing Sunglass Frames of the present invention as herein shown and disclosed in detail is fully capable of obtaining the objects and providing the advantages herein before stated, it is to be understood that it is merely illustrative of a preferred embodiment of the invention and that no limitations are intended to the details of construction or design herein shown other than as described in the appended claims.

I claim:

1. A color changing sunglass frame comprising:

a sunglass frame having a surface; and a color changing means on said surface and responsive to ultraviolet light, wherein said color changing means changes from a first color to a second color.

2. The color changing sunglass frame in claim 1, wherein said color changing means further comprises a photo-chromatic dye.

3. The color changing sunglass frame in claim 2, wherein said color changing means further comprises a background and a pattern, wherein said background has a different color than said pattern.

4. The color changing sunglass frame in claim 3, wherein said background and said pattern form a tortoise shell design.

5. The color changing sunglass frame in claim 3, wherein said background and said pattern form a marble design.

6. The color changing sunglass frame in claim 3, wherein said background and said pattern form a zebra design.

7. The color changing sunglass frame in claim 3, wherein said background and said pattern form a leopard design.

8. The color changing sunglass frame in claim 3, wherein said background and said pattern form a plaid design, said plaid design orientated in any direction.

9. The color changing sunglass frame in claim 3, wherein said background and said pattern form a striped design, said striped design orientated in any direction.

10. The color changing sunglass frame in claim 2, wherein said color changing means is spray coated onto said surface of said sunglass frame.

11. The color changing sunglass frame in claim 10, wherein said color changing means further comprises a background and a pattern, wherein said background has a different color than said pattern.

12. A color changing sunglass frame comprising:
   a sunglass frame, wherein said sunglass frame is constructed of a plastic; and
   a color changing means which is contained within said plastic of said sunglass frame and responsive to ultraviolet light, wherein said color changing means changes from a first color to a second color.

13. The color changing sunglass frame in claim 12, wherein said color changing means is injected into said plastic.

14. The color changing sunglass frame in claim 13, wherein said color changing means further comprises a background and a pattern, wherein said background has a different color than said pattern.

15. The color changing sunglass frame in claim 12, wherein said color changing means is mixed with said plastic.

16. The color changing sunglass frame in claim 15, wherein said color changing means further comprises a background and a pattern, wherein said background has a different color than said pattern.

* * * * *